United States Patent
Mack et al.

(10) Patent No.: US 7,414,984 B2
(45) Date of Patent: Aug. 19, 2008

(54) SYSTEM AND METHOD FOR EFFICIENT ADDITION OF NETWORK RESOURCES

(75) Inventors: Robert E. Mack, Collegeville, PA (US); Scott Randell, Schwenksville, PA (US); David H. Brouda, Newtown, PA (US)

(73) Assignee: General Instrument Corporation, Horsham, PA (US)

( * ) Notice: Subject to any disclaimer, the term of this patent is extended or adjusted under 35 U.S.C. 154(b) by 718 days.

(21) Appl. No.: 10/928,236

(22) Filed: Aug. 27, 2004

(65) Prior Publication Data

US 2006/0045086 A1    Mar. 2, 2006

(51) Int. Cl.
*H04L 12/28* (2006.01)
(52) U.S. Cl. .................. 370/254; 370/400; 709/221; 725/98; 725/118
(58) Field of Classification Search .............. 725/98
See application file for complete search history.

(56) References Cited

U.S. PATENT DOCUMENTS

| | | | |
|---|---|---|---|
| 5,953,318 A * | 9/1999 | Nattkemper et al. | 370/236 |
| 6,240,082 B1 * | 5/2001 | Kim et al. | 370/342 |
| 6,636,485 B1 * | 10/2003 | Fijolek et al. | 370/252 |
| 2003/0126617 A1 * | 7/2003 | Tewari et al. | 725/119 |

* cited by examiner

*Primary Examiner*—Wing F. Chan
*Assistant Examiner*—Brian Roberts
(74) *Attorney, Agent, or Firm*—Stewart M. Wiener

(57) ABSTRACT

A system and method for efficiently adding a new network resource to a digital video network, without the need to purchase costly ancillary network hardware or extensive manual configuration, is disclosed. The inventive system and method provide for a loop-through for adding new resources to a digital video network. The present invention provides for the resources to be daisy chained from the network switch, where each resource is configured simply as either a loop-through ("LT") resource or the "last" resource in the daisy chain. Then, only upstream traffic with Media Access Control ("MAC") addresses of upstream LT resources are transmitted out of the loop-through by the last network resource.

19 Claims, 2 Drawing Sheets

SYSTEM AND METHOD FOR EFFICIENT ADDITION OF NETWORK RESOURCES

FIELD OF THE INVENTION

The present invention relates to digital video networks. More specifically, the present invention relates to the scaling up of network resources in a digital video network.

BACKGROUND OF THE INVENTION

With the widespread acceptance of using digital networks as a delivery means for broadcast and other video content, service providers have recently been confronted with numerous issues relating to system load and associated network resources. In particular, "on-demand" video delivery is one of the most problematic areas in this regard.

As more digital video subscribers embrace on-demand services, the digital video network's resources must be scaled upward to meet cumulative subscriber demand. On-demand is more problematic than digital broadcast signals because on-demand services require a unique digital stream for each requesting subscriber.

The additional of new network resources to meet on-demand system loads is not an easy process and often requires the simultaneous addition of other ancillary network hardware, e.g., gigabit switch interfaces, gigabit switch, router, etc., which are typically very costly. For example, if an new encryption multiplexer resource must be added to a digital video network, such an addition will typically require at least a new transmitter and receiver interface at the Gigabit switch. The cost of such transmitter and receiver interfaces is cost prohibitive. (Further, the same scenario can exist at a high bandwidth router or any other type of signal routing/switching apparatus.)

Network resources can be daisy chained to eliminate the need for ancillary network hardware, however, in order to prevent a data loop, extensive manually configuration of each network resource would need to be performed by the digital video network operator/installer. Such extensive manually configuration is undesirable and inefficient.

There exists a need to enable new network resources to be added to a digital video network without the need to purchase costly ancillary network hardware or extensive manual configuration.

SUMMARY OF INVENTION

An object of the present invention is to provide an efficient system and method for adding new network resources ("resources") to a digital video network.

In order to achieve this objective, as well as others which will become apparent in the disclosure below, the present invention provides for a loop-through system and method for adding new resources to a digital video network. In accordance with an exemplary embodiment of the present invention, the resources are daisy chained from the network switch, where each resource is configured simply as either a loop-through ("LT") resource or the "last" resource in the daisy chain.

In accordance with an exemplary embodiment of the present invention, each LT resource in the daisy chain transmits a Media Access Control ('MAC") Address Advertisement Ethernet frame ("frame") to a well known multicast MAC address, e.g., "01:00:5E:7F:25:25". This frame has the source MAC address of the LT resource that transmitted it. The last resource receives this well-known multicast and extracts the associated source MAC address. The last resource uses the extracted source MAC address to set up a filter that allows only upstream traffic that has a source MAC address from one of the LT resources in the native daisy chain. In this way, the present invention prevents data loops, and other problems associated with looping configurations, e.g., Spanning Tree protocol port shutdown and bridge table clearing on connecting network switches.

Further, in accordance with an exemplary embodiment of the present invention, the well-known multicast will also terminate at the last resource, so that it will never leave the segment containing the daisy chained resources. This enables multiple daisy chains to co-exists and to have all LT resources, regardless of their particular daisy chain, to use the same multicast MAC address without conflicting.

Thus, the present invention's daisy chained resources function as in any bi-directional network in that upstream responses will be supported in a conventional fashion. Further, packets that are transmitted onto a loop-through configuration of the present invention terminated on that segment, i.e., no data loops. In addition and most importantly, no operator configuration is required, other than to identify the last resource in the daisy chain so that the last resource can retrieve the MAC addresses from the upstream LT resources and can filter packets accordingly. This also allows resources to be replaced without any additional operator intervention. If an upstream LT resource in the chain is replaced, it will simply transmit a multicast identifying a new MAC address to the filtering last resource.

The present invention provides for efficient system and method for adding new resources to a digital video network without the need to purchase costly ancillary network hardware or extensive manual configuration.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DESCRIPTION OF A PRESENTLY PREFERRED EMBODIMENT

Figure 1:
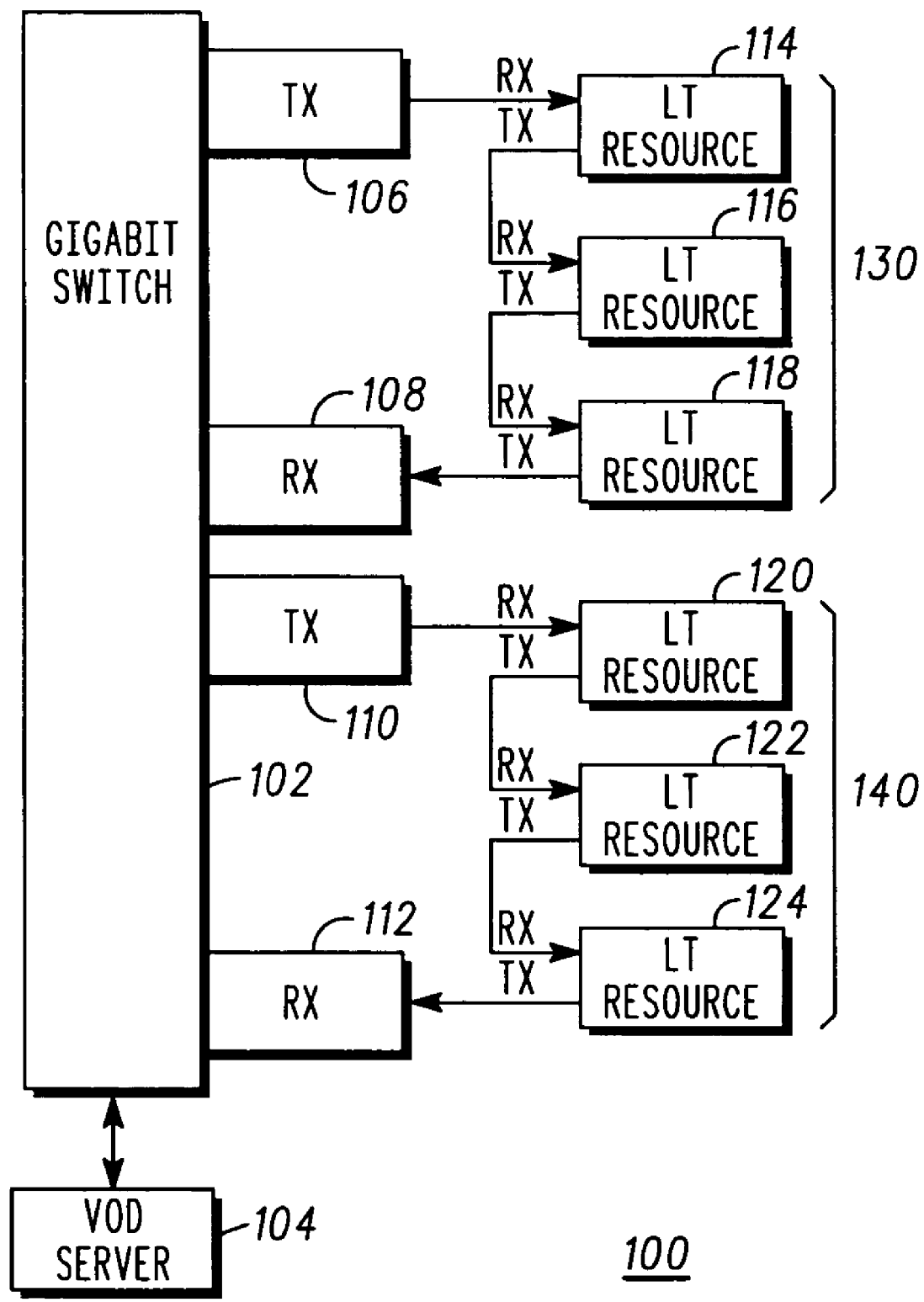
FIG. 1 is an illustration of a system for adding a new resource to a digital video network by configuring a loop-through in accordance with an exemplary embodiment of the present invention.

Referring to FIG. 1, system 100 is shown. System 100 is a system for efficiently adding new resources to a digital video network. System 100 includes a Gigabit switch 102, video on-demand ("VOD") server 104, and two loop-through resource daisy chains 130, 140. (System 100 is an exemplary system, in terms of its setting in the video on-demand arena, and is representative of any digital video network, including digital broadcast networks.)

Gigabit switch 102 is interconnected to VOD server 104 for the transmission and reception of digital video data for processing by resources in daisy chains 130, 140. Gigabit switch 102 includes a plurality of modular transmitters 106, 110 and receivers 108, 112 interfaces for interconnection with resources in daisy chains 130, 140. Each daisy chain 130, 140 include a plurality of resources which may be loop-through ("LT") resources 114, 116, 120, 122 or the last resource 118, 124 in the daisy chain, respectively. Further, each resource has both a transmitter (Tx) and receiver (Rx) for interconnection with each other.

Figure 2:
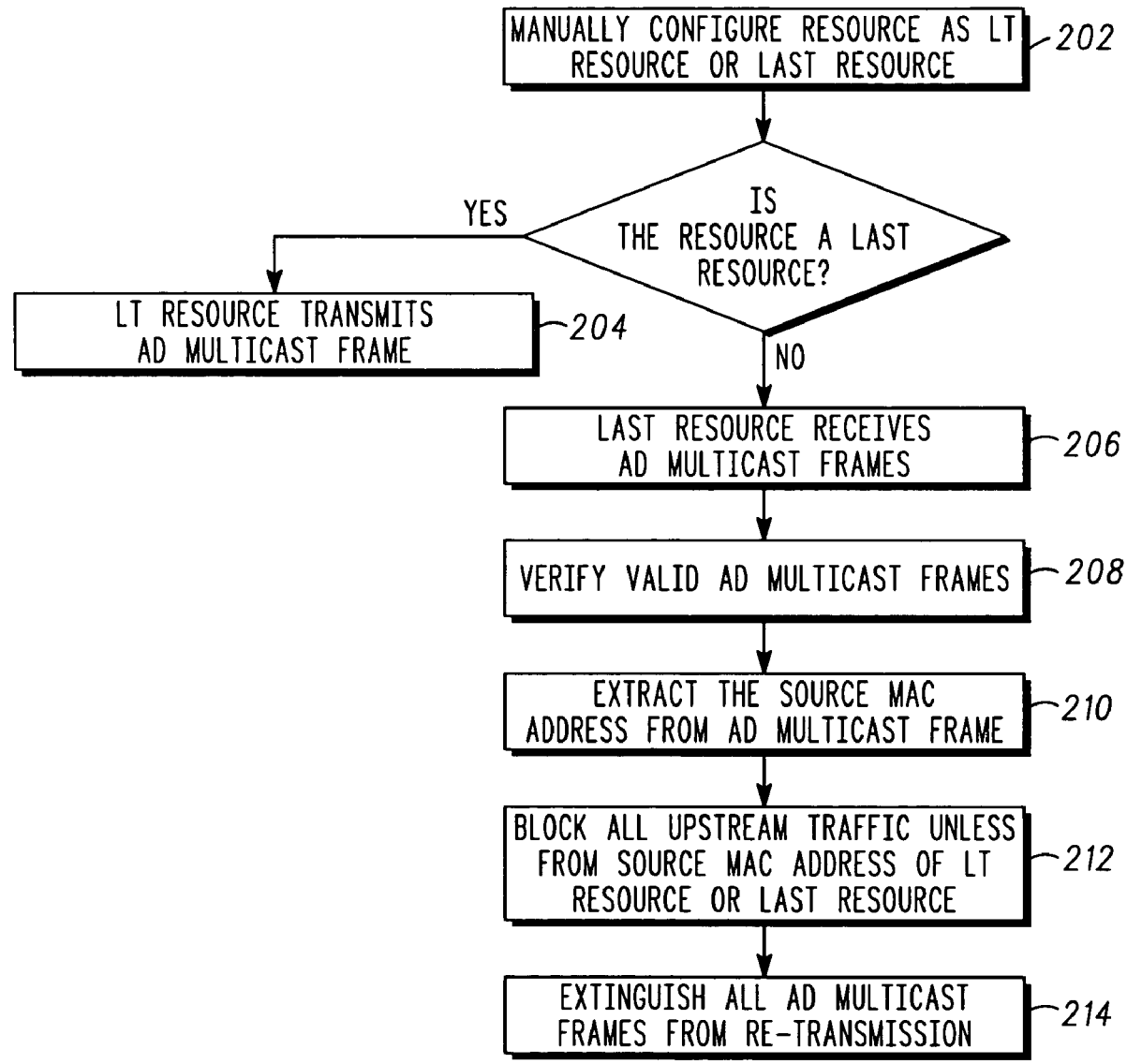
FIG. 2 is a flow diagram showing the basic process flow for the automatic filtering of data in the loop-through configuration of FIG. 1 in accordance with an exemplary embodiment of the present invention.

Referring to FIG. 2, in operation, only one manual step is required by an operator. That one manual step is to set each resource as a loop-through resource 114, 116, 120, 122 or last resource 118, 124, in step 202. Alternatively, each resource can be set to be a "LT resource" as a default, which then would only require the operator to designate one resource device in chain the "last resource". A loop-through resource 114, 116, 120, 122 is an additional resource inserted in the system to create a daisy chain (if only one resource previously existed) or further elongate an existing daisy chain, and that is not the last resource in the daisy chain. A last resource 118, 124 is an additional resource inserted in the system to create a daisy chain (if only one resource previously existed) or further elongate a daisy chain, and that is the last resource in the daisy chain. The designation of "loop-through resource" or "last resource" can be an easily toggled configuration parameter performed by an operator. Such toggle can be as simply as a physical switch, or firmware state. After the above described one manual configuration, the remaining complex configuration is automated by the present invention.

If the new resource to be added is a LT resource 114, 116, 120, 122, after the LT resource 114, 116, 120, 122 is interconnected to a daisy chain 130, 140, as depicted in FIG. 1, and booted-up, the LT resource 114, 116, 120, 122 automatically transmits a MAC Address Advertisement Ethernet frame ("frame") to a Well-Known MAC multicast address, e.g., 01:00:5E:7F:25:25, in step 204. The frame will contain the Gigabit Ethernet interface's Source MAC address and the Ethernet Type field, e.g., "0x8710". This broadcast preferably occurs immediately after boot-up and periodically thereafter with a period of 5 seconds.

If a resource is configured as a last resource 118, 124, it will receive frames from the loop-through resource(s) 114, 116, 120, 122, in step 206. The last resource 118, 124 will verify that these frames are valid MAC Address Advertisement Ethernet frames by checking the destination multicast MAC address and Ethernet frame type value of 0x8710, in step 208. The last resource 118, 124 will then extract the Source MAC address from each frame, in step 210, and will use the extracted Source MAC address in its upstream filter. In particular, the last resource 118, 124 will block all upstream traffic unless the incoming Ethernet frame contains the source MAC address of a LT resource 114, 116, 120, 122 in the daisy chain group, in step 212. Thus, the frame provides the last resource 118, 124 in the daisy chain, respectively, with the Source MAC addresses of the devices whose frames will be permitted to pass. Preferably, the last resource 118, 124 is capable of filtering at least sixteen (16) different Source MAC addresses. In addition, the last resource 118, 124 includes a timer associated with each Source MAC address being used in the filter. A Source MAC address shall timeout after 30 seconds, if a frame is not received from a particular upstream LT resource for that Source Mac address. The above-described timeout feature is done to respond to changes in the topology, e.g., removing an old source MAC address, corresponding to a LT resource 114, 116, 120, 122 that has been removed or swapped out, in the filter in the last resource 118, 124.

In order to allow multiple daisy chains in a network, the present invention provides for a system and method for extinguishing the MAC Address Advertisement frames from being broadcast while allowing singlecasts (unicasts), multicasts, and broadcasts to pass through the last resource that emanated from the LT resources 114, 116, 120, 122 or last resource 118, 124 making up the daisy-chain.

In operation, the LT resource 114, 116, 120, 122 consumes all singlecast Ethernet frames that are destined for that particular LT resource 114, 116, 120, 122 (i.e., addressed for that particular device). Thus, these singlecast packets will not be re-transmitted out onto the transmit side of the LT resource's interface. All LT resources 114, 116, 120, 122 shall pass all singlecast Ethernet frames from the receive side of its interface to the transmit side of its interface which are not addressed to that LT resource 114, 116, 120, 122. Further, a LT resource 114, 116, 120, 122 receives and passes through to the transmit side of the interface any broadcast or multicast Ethernet that have been received on the receive side of the interface. The remaining singlecast, multicast, and broadcast frames are received by the last resource 118, 124. To prevent multicast message collision between daisy chains 130, 140, the last resource 118, 124, respectively, prevents the forwarding of all MAC Address Advertisement Ethernet frames to its transmit output, in step 214. Thus, the well-known multicast will terminate at the last resource 118,124, so that it will never leave the segment containing the daisy chained 130, 140 LT resources 114, 116, 120, 122.

The benefits of the present invention are tri-fold. First, all resources 114, 116, 120, 122, 118, 124 will function in loop-through as in any bi-directional network; that is upstream responses will be supported in a conventional manner. In addition, packets that are transmitted onto a daisy chain 130, 140 are terminated on that segment, i.e., no data loops. Secondly, no operator configuration is required, other than to identify the last resource 118, 124 in the daisy chain 130, 140 so that it can retrieve the MAC addresses from the upstream LT resources 114, 116, 120, 122 and can filter packets accordingly. Most significantly, the present invention allows resources 114, 116, 120, 122, 118, 124 to be added or replaced without any additional operator intervention or expensive ancillary network equipment such as Gigabit transmitters or receivers, or other ancillary network hardware. Third, by terminating all other traffic in the last resource, no loops are created that might cause a switch port shutdown due to Spanning Tree Protocol. This will also prevent clearing of the switch's bridge table, which would occur if a packet with the same source MAC address shows up on two different ports.

Thus, the present invention provides for an efficient system and method for adding new resources to a digital video network without the need to purchase costly ancillary network hardware or extensive manual configuration.

Although the invention has been described herein by reference to an exemplary embodiment thereof, it will be understood that such embodiment is susceptible of modification and variation without departing from the inventive concepts disclosed. For example, network resources other than digital video network resource can be employ in the system and method of the present invention. All such modifications and variations, therefore, are intended to be encompassed within the spirit and scope of the appended claims.

We claim:

1. A method for adding an additional network resource to a data network having a pre-existing network resource, said method comprising:

defining an additional network resource as one of a loop-through network resource or last network resource, such that at least one of the network resources is a loop-through network resource and at least one of the network resources is a last network resource;

coupling said additional network resource to one of a transmitter or a receiver of the pre-existing network resource;
transmitting a media access control address advertisement Ethernet frame to a media access control multicast address if said additional resource is a loop-though resource; and
receiving at least one said frame from a loop-through resource if said additional resource is a last network resource; said last resource extracting a source media access control address from each said frame; said last network resource blocking all upstream traffic frames unless said upstream traffic frames contain a source media access control address matching at least one of said extracted source addresses.

2. The method of claim 1, wherein said multicast address is 01:00:5E:7F:25:25.

3. The method of claim 1, wherein said frame comprises at least one source address.

4. The method of claim 1, wherein an Ethernet Type field of the media access control address advertisement Ethernet frame is set to 0×8710.

5. The method of claim 1, wherein said loop-through network resource transmits said frame immediately after boot-up.

6. The method of claim 1, wherein said loop-through network resource transmits said frame based upon a pre-defined period.

7. The method of claim 6, wherein said pre-defined period is 5 seconds.

8. The method of claim 1, wherein said step of said last network resource receiving said frame comprises said last resource verifying that said frame is valid.

9. The method of claim 8, wherein said set of verifying comprises using a destination multicast address and Ethernet frame type value to verify.

10. The method of claim 9, wherein said Ethernet frame type is 0×8710.

11. The method of claim 1, wherein said last resource comprises a timer for each of said source addresses, said timer timing out if a frame is not received containing said source address associated with a loop-through resource in a pre-defined timeout period.

12. The method of claim 11, wherein said timeout period is 30 seconds.

13. The method of claim 1, wherein said last network resource terminates transmission of said media access control address advertisement Ethernet frames with said multicast address transmitted from loop-through network resources in the same daisy chain.

14. A system for adding an additional network resource to a data network, said system comprising:
at least one loop-through network resource, said loop-through network resource transmitting a media access control address advertisement Ethernet frame to a media access control multicast address; and
at least one last network resource coupled to said loop-through network resource, said last resource receiving at least one said frame and extracting a source media access control address from each said frame; said last network resource blocking all upstream traffic frames unless said upstream traffic frames contain a source media access control address matching at least one of said extracted source addresses.

15. The system of claim 14, wherein said multicast address is 01:00:5E:7F:25:25.

16. The system of claim 14, wherein said frame comprises at least one source address.

17. The system of claim 14, wherein an Ethernet Type field of the media access control address advertisement Ethernet frame is set to 0×8710.

18. The system of claim 14, wherein said last resource comprises a timer for each of said source addresses, said timer timing out if a frame is not received containing said source address associated with a loop-through resource in a pre-defined timeout period.

19. The system of claim 18, wherein said timeout period is 30 seconds.

* * * * *

UNITED STATES PATENT AND TRADEMARK OFFICE
CERTIFICATE OF CORRECTION

PATENT NO. : 7,414,984 B2 Page 1 of 1
APPLICATION NO. : 10/928236
DATED : August 19, 2008
INVENTOR(S) : Mack et al.

It is certified that error appears in the above-identified patent and that said Letters Patent is hereby corrected as shown below:

COLUMN 2:
Line 13: Please delete "co-exists" and replace with --co-exist--

Signed and Sealed this

Twenty-second Day of September, 2009

David J. Kappos
*Director of the United States Patent and Trademark Office*